Oct. 1, 1940. E. K. CLARK Re. 21,585

SADIRON

Original Filed May 21, 1936 4 Sheets-Sheet 1

WITNESSES:
C. J. Weller.
W. H. Whitten

INVENTOR
Earl K. Clark.
BY
W. O. R. Coley
ATTORNEY

Oct. 1, 1940. E. K. CLARK Re. 21,585

SADIRON

Original Filed May 21, 1936 4 Sheets-Sheet 2

WITNESSES:

C. J. Weller.

W. H. Schutte

INVENTOR

Earl K. Clark.

BY

W. O. R. Coley

ATTORNEY

Oct. 1, 1940. E. K. CLARK Re. 21,585

SADIRON

Original Filed May 21, 1936 4 Sheets-Sheet 3

WITNESSES:

C. J. Weller.

H. A. Whitten

INVENTOR

Earl K. Clark.

BY W. R. Coley

ATTORNEY

Oct. 1, 1940. E. K. CLARK Re. 21,585

SADIRON

Original Filed May 21, 1936 4 Sheets-Sheet 4

WITNESSES:
C. J. Weller.
A. H. Walton

INVENTOR
Earl K. Clark.
BY
W. R. Coley
ATTORNEY

Reissued Oct. 1, 1940

Re. 21,585

UNITED STATES PATENT OFFICE 21,585

SADIRON

Earl K. Clark, West Mansfield, Ohio, assignor to Westinghouse Electric & Manufacturing Company, East Pittsburgh, Pa., a corporation of Pennsylvania Original No. 2,180,399, dated November 21, 1939, Serial No. 81,052, May 21, 1936. Application for reissue July 20, 1940, Serial No. 346,665

11 Claims. (Cl. 219—25)

This invention relates to electrically heated sadirons and particularly to such irons for domestic use.

It has been usual heretofore to connect such irons to a supply circuit by means of a flexible conductor cord detachably connected to the iron, which construction has caused considerable trouble from burn-outs; and it is one object of the present invention, therefore, to permanently secure the conductor cord to the iron and to provide a switch in the iron for shutting off power.

It is a further object of this invention to prevent the handle of the iron from becoming hot.

It is a further object of this invention to largely diminish the amount of heat radiated from the iron to the user's hand.

It is a further object of this invention to provide a thermal shunt whereby a very large part of the heat which goes upward from the heater is diverted and conducted to the base of the iron.

It is a further object of this invention to intimately unite the base of the iron, the heater and a cover plate over the heater into one body to thus provide high thermal conduction and secure the parts against mechanical separation.

It is a further object of this invention to provide such a body with means for holding the several parts thereof against relative movement such as would result from either the base of the cover plate bending out of the plane it should occupy.

It is a further object of this invention to so mount the casing on the base that very little heat will flow into the casing by conduction from the base.

It is a further object of this invention to make the casing of good reflective material whereby it will receive or deliver but little heat by radiation.

It is a further object of this invention to secure the flexible conductor cord to the handle of the iron in such a position and in such a direction that it will not interfere with the use of the iron for its work nor with the placing of the iron in its position of rest.

It is a further object of this invention to provide means located on the top of the casing or housing for adjusting a thermostat within the iron, indicia on the adjusting means serving to indicate the goods for which the temperature of the iron at the particular setting of the thermostat indicated is appropriate for ironing purposes.

It is a further object of this invention to provide a point on the handle of the iron to cooperate as a reference point with the indicia on the adjusting means.

It is a further object of this invention to secure the handle to the housing in such a way that end surfaces of ample area are provided and a minimum of heat conduction will occur between the housing and the handle.

It is a further object of this invention to provide a recess in the handle which shall accommodate the connection means by which the flexible conductors of the cord are connected to the mechanism of the iron. It is also an object in providing this recess to cause the recessed portion of the handle to conform to the lines of the handle as a whole.

It is a further object of this invention to secure the end of the flexible conductor cord in one wall of the recess.

It is a further object of this invention to provide a reinforcement for the cord which shall assist in the above-mentioned securing thereof.

It is a further object of this invention to provide a support for the conductors extending within the housing from the flexible conductor cord to various parts of the iron and to insulate such conductors from the support.

It is a further object of this invention to provide a switch so cooperating with the adjusting means for the thermostat that when the adjustment is moved to its extreme low-temperature position, current is completely shut off from the heater.

It is a further object of this invention to provide a switch which shall remain closed through all of the adjusting movement, except the very last portion of the movement to an extreme position and shall be opened an ample amount by the last portion of the adjusting movement.

Other objects of the invention and details of the construction will be apparent from the following description and the accompanying drawings, in which.

The illustrated sadiron comprises a base 1, preferably of forged steel of the usual general shape for the bottom of a sadiron and the weight of which constitutes most of the weight of the iron. If preferred the base may be of cast iron. As shown best in Fig. 12, the heater 2 by which this base is heated is thin and extends over a large portion of the area of the base and is in close proximity therewith. The heater may be of the usual form comprising a sheet of mica with resistance wire wound thereon plus top and bottom mica plates used for insulation. Since the construction of the heater in itself forms no part of this invention, it is unnecessary to describe or illustrate it in further detail.

The edges of the base are thicker than the body thereof and are equipped with flanges 3 which constitute upstanding edges to the dish-like main body of the base. The upstanding edge is somewhat wider at the point of the iron as may be seen at 4 in Fig. 11. At the rear of the iron the central part of the edge has a flange about the same thickness as the flanges 3 along the sides. The inner surface of the rear flange may be seen at 5 in Fig. 11 and a section of the central part thereof at 5 in Fig. 1.

Figure 1:
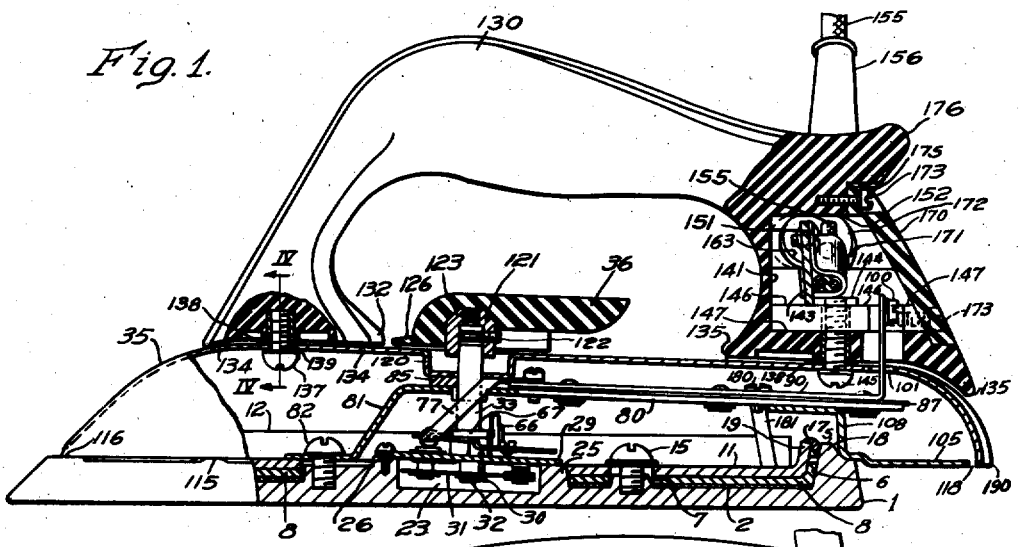
Figure 1 is a longitudinal elevational view of the iron, partly in section.
Figure 12:
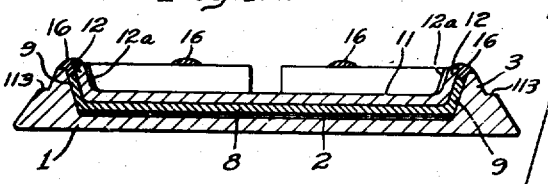
Fig. 12 is a sectional view taken on the line XII—XII of Fig. 11.

A plate 8 of copper or other good heat conducting material is provided next to the heater upon the face thereof farthest from the base 1, as shown most clearly in Figs. 1 and 12. This plate has upturned edges 9 in contact with the inner surfaces of the flange 3 throughout the sides of the iron. At the rear edge of the base there is no upstanding flange except in the middle third and no upturned part of copper plate 8 except in contact with this portion as shown at 6. A plate of steel 11 is placed upon the top of the copper plate 8. This also has upturned edges 12 in contact with the flanges 9 of the copper part.

In assembling this portion of the sadiron, the heater 2 is placed on the floor of the base 1. The copper plate 8 is placed on the heater and the steel plate 11 is placed on the copper. The assembled plates are then subjected to heavy hydraulic pressure whereby they are brought into close contact with one another and the copper is caused to flow into any irregularities in the other parts which may exist by reason of making intimate contact throughout the adjacent surfaces.

While the parts are under pressure, the top of the flanges 3, 9 and 12 are secured together by spot welding, preferably with an arc weld. These welds are at spaced intervals along the edges as shown at 16. There is also a weld at the rear of the iron, shown at 17, which unites the upstanding flange 18 occupying the middle portion of the rear edge of the base 1 and the flange 19 on the plate 11 extending along a like part of the rear edge of that plate.

While the pressure is being exerted there is a tendency for the copper plate 8 to creep toward the rear of the iron. The flange 5 at the rear of the iron resists this tendency.

Between flanges 18 and 19 the copper flange 6 is enclosed and is also secured by the weld 17. The copper flange 6 is separated from the ends of the flanges 9 by a portion of the edge of the copper which is not turned up and which extends over each outer third of the back. The copper plate 8 and the steel plate 11 are provided with notches near the middle of each outer third of the rear edge to accommodate the leads to the heater and the insulation thereon. After the welds are made, the base is a mechanical unit and may be handled without danger of dislocation of the parts thereof.

After the spot welding has been done, a screw 15 is driven through holes provided for that purpose in the heater 2, the copper plate 8 and the steel plate 11 to secure the parts against buckling. A hose 7 in the base 1 extending part way through said holes affords a strong receiving socket threaded for the screw which thus confines the parts between the base 1 and the washer under its head.

Along the side edges the flange 9 of the copper plate 8 is clamped between the flange 3 of the base and the flange 12 of the steel plate 11. The flange 12 is corrugated as shown at 12*a*. When the parts are brought together under pressure as above described, these corrugations provide space to accommodate the flow of the copper under its swedging action. The soft copper is then brought into intimate thermal contact with the flange 3 and the flange 12, insuring good thermal conductivity from the plate 11 to the base 1.

A well 23 in about the middle of the base 1 extends so near to the bottom of the base that the portion of the base under the well is thinner than any other part of the base.

Figure 14:
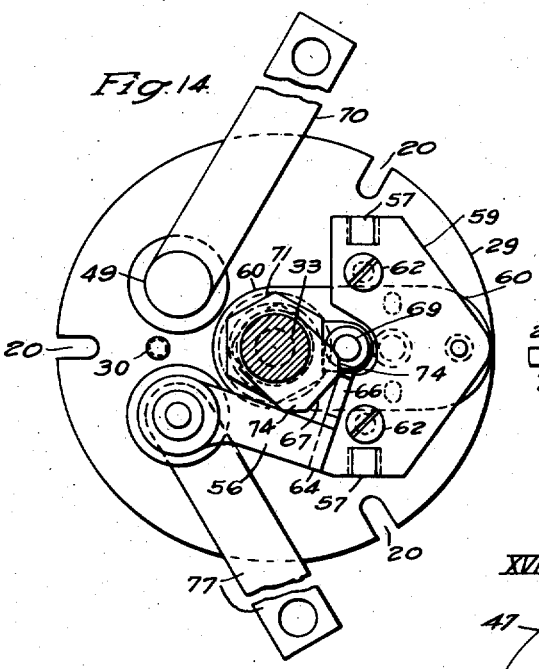
Fig. 14 is a top plan view of the thermostat.

This well is provided with a parapet 25 on the rear side and a projection on the front side to accommodate holes for screws by which parts are secured to the side walls of the well. The thermostat is supported in the well 23 by a foundation plate 29, best shown in Figs. 14 and 16 and in section in Fig. 1. Notches 20 in the plate 29 cooperate with screws 26, one of which is seen in Fig. 1, to secure plate 29 over the well.

Figure 15:
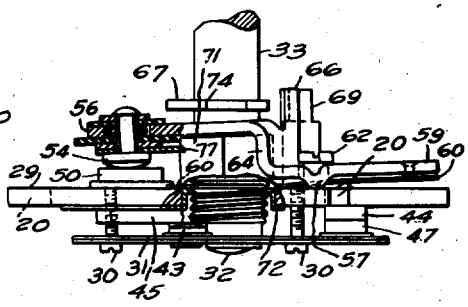
Fig. 15 is a view partly in section and partly in side elevation of the thermostat showing the associated switch in closed position.
Figure 16:
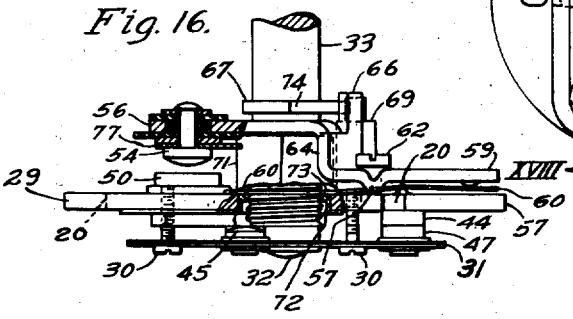
Fig. 16 is a similar view showing the switch in open position.

Screws 30, Figs. 15 and 16, mounted in the foundation plate 29 and extending through holes 34 (Fig. 17) in disk 31 afford bearings for the disk 31. The disk 31 is of bimetal and is carried at the lower end of a shaft 33 which extends to the top of the housing 35 where it is manipulated by means of an adjustment lever 36. The disk 31 is secured to the shaft 33 by heading the shaft over a washer, as shown at 32.

Figure 17:
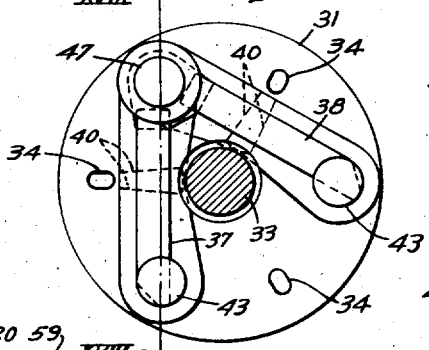
Fig. 17 is a top plan view of the thermostat disk and associated parts.
Figure 18:
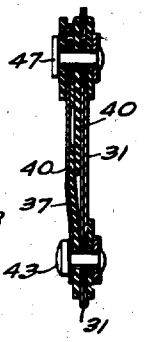
Fig. 18 is a sectional view taken on the line XVIII—XVIII of Fig. 17.

Conductor strips 37 and 38 mounted upon the upper side of the disk 31, which is the left-hand side in Fig. 18, are separated from the disk by pieces of mica 40 which overlap, as is indicated in dotted lines in Fig. 17.

Contact terminals 43 are on the upper ends of rivets which extend through the disk 31, mica 40 and the conductors 37 and 38 and cooperate with contacts carried on plate 29 but insulated therefrom. At the junction of conductors 37 and 38 there is a rivet extending through both and the disk 31 and ending in a flat head 47. This head has no electrical function but serves to cooperate with a head 44 on disk 29 to present a symmetrical stop for the disk 31. Because the stop is symmetrical about the shaft 33, tendency for the disk to work loose is minimized. The conductors 37 and 38 form an uninterrupted connection from one rivet 43 through an irregular shaped washer to which they are welded to the other rivet 43. Rivets 49 and 50, extending through plate 29, have at their lower ends contacts 45 cooperating with the contacts 43. At the upper end of rivet 49 it is connected to a ribbon 70.

The upper end of rivet 50 is a contact to cooperate with contact 54 carried by the lever 56 but insulated therefrom as shown most clearly in Figs. 15 and 16. The lever 56 is provided with two downwardly off-set portions 57 which bear against the plate 29. The portion 59 of the lever 56 between the portions 57 is a blunt pointed triangle. A spring 60 presses against the under side of the apex of the triangle 59 and tends to depress the contact 54. Upward movement of the lever as a whole is prevented by screws 62 which extend through the lever near the base of the triangle 59 and hold it, with a certain lost motion, against the support plate 29. The degree to which the portions 57 are struck downward serves to determine spacing of lever 56 and thus the normal position of contact 54.

The lever 56 has two right angle bends whereby an upwardly extending part 64 is formed therein which permits the end of the lever carrying the contact 54 to be at a higher level than the triangle 59. The vertically extending portion has a projection at one side thereof which forms an upstanding part 66, which extends into the pathway of a projection 67 rigidly fastened to the shaft 33. A post 69 secured in the foundation plate 29 extends close to, and nearly parallel with, the extending arm 66 and forms a stop against which the projection 67 comes to rest. The upper part of post 69 is of smaller diameter to afford room for projection 67 to move further before reaching its stop but the lower part is made large enough to provide ample metal to secure the post to the plate 29.

The shaft 33 is screw threaded where it goes through the foundation plate 29. A nut 71, threaded to cooperate with the threads on the shaft 33, is secured to the plate 29 by means of a skirt 72 which is turned outwardly against the under face of the plate 29.

The spring 60 is secured in place by being fastened between the nut 71 and the foundation plate 29, as shown at 73 in Fig. 16. A hole for the shaft 33 is provided in spring 60 near the end thereof. A circumferential groove is provided in the shaft 33 and the projecting piece 67 is forced into this groove with a driving fit. Preferably, the part of the piece 67 which enters the groove is ribbed and the ribs insure a firm grip between the sides of the groove and the projecting piece. The corners of the projecting piece 67, preferably are rounded or beveled as indicated at 74 in Fig. 15 for easy cam action against the extension 66.

A ribbon 70 and a similar ribbon 77 are attached under the rivet head 49 on the foundation plate 29 and the head 54 in the lever 56, respectively. The ribbons are of a metal which is somewhat flexible but is largely lacking in resilience. It will take whatever position it is bent into and will maintain that position with sufficient stiffness to provide convenience in assembling the device, but can yield the small amount necessary to follow lever 56.

Figure 9:
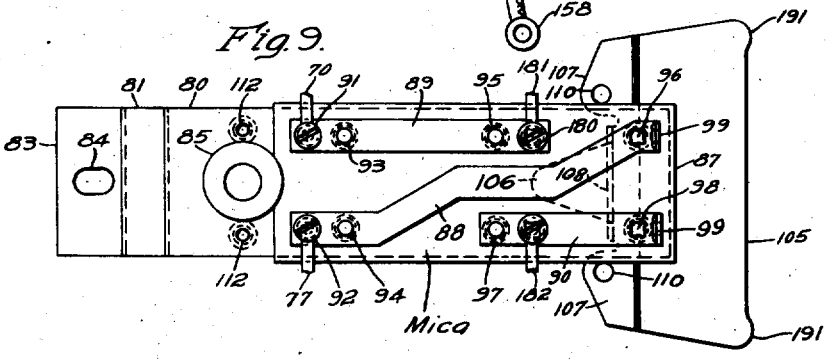
Fig. 9 is a top plan view of the conductor-supporting shelf.
Figure 10:
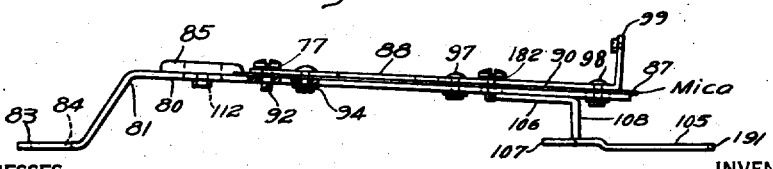
Fig. 10 is a side elevational view of said shelf.

These ribbons 70 and 77 extend from the thermostat and switch to conductors carried upon a shelf 80, shown in detail in Figs. 9 and 10. An upwardly extending leg 81 supports the body of the shelf from the base of the iron to which it is fastened by means of a screw 82, Fig. 1. The foot 83 at the bottom of the leg 81 contains a perforation 84 for cooperation with the screw 82. This perforation is not round but elongated to provide for variations in position of the shelf and the base when the iron is assembled.

A collar 85 secured to the shelf 80 where it is traversed by the shaft 33, affords a stop against which the shelf can be positioned.

A sheet of mica 87 extends lengthwise of the shelf and may, if desired, project slightly beyond the shelf at the side and rear. The mica separates the shelf from the conductors mounted thereon, which include a central conductor 88, a longitudinal conductor 89 which extends over only part of the shelf and a second longitudinal conductor 90 which extends over the other part.

The two ribbons 70 and 77 extend from their described connections in the thermostat and switch to the terminals 91 and 92 which are at the forward end of the conductors 88 and 89. Binding screws are provided at these points. The conductors are threaded where these binding screws traverse them, but the cooperating holes in the shelf are made larger than the screws and are unthreaded. The ends of the ribbons are perforated with holes that slip easily over the threads. A very convenient way of making connections is thus provided.

Figure 5:
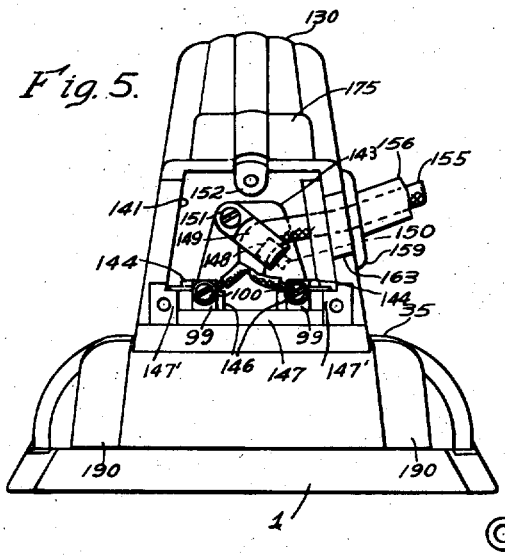
Fig. 5 is a rear elevational view of the iron with the cover of the handle recess removed.

Rivets 93 and 94, adjacent the screws, are insulated from the shelf by appropriate washers and secure the conductors in place. Similar rivets 95 and 96 similarly insulated from the shelf, secure the other ends of the same conductors to the shelf. A similar pair of rivets 97 and 98 are installed near each end of the conductor 90. The rear ends of the conductors 88 and 90 have upwardly turned parts 99 which extend through the housing 35, as shown in Fig. 1. A slot 101, Fig. 1, is provided in the housing for their accommodation. At their upper ends they are provided with screw threaded orifices, and the screws cooperating therewith are shown at 100 in Figs. 1 and 5.

The rear end of the shelf 80 has secured thereto a support 105. A triangular tab 106 affords sufficient area for welding, brazing or other means by which the support is secured to the shelf. The under-surface of the rearmost part of the support 105 affords convenient location for a trade-mark, size numbering or other desired legend, since it is outside of the iron, being beyond the rear edge of the base 1. It has two ears 107 which extend forward of the upright portion 108 and are provided with holes 110 through which assembly screws may be passed which enter holes 109, Fig. 11, in the rear edge of the base.

The shelf 80 is thus secured to the base and supported therefrom only by the leg 81 and the upright portion 108. These being of steel afford only small thermal conductive connection between the base 1 and the shelf 80. The shelf, therefore, is but slightly heated by conduction from the base.

Two threaded holes 112 in the shelf 80 on each of the collar 85 provide a grip for screws 112a by which the housing 35 is secured in place. When the screws 112a are driven home they draw the depressed part 120 of the housing against the collar 85 on the shelf 80, thus positioning both parts.

The housing 35 extends down into contact with the base 1, but this contact is not continuous. There are lugs 115 on the upper surface or ledge 113 in the edge 3 outside the flange which contact with the edge of the housing as clearly shown in Fig. 13.

Figure 13:
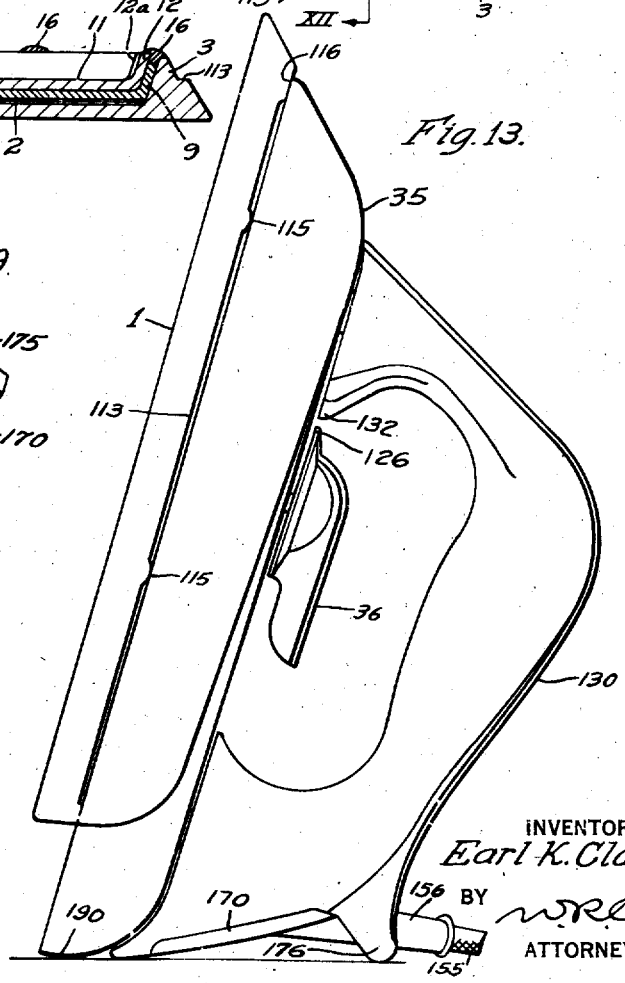
Fig. 13 is a side elevational view of the iron in its resting position.

There is a lug or elevation 116 at the point of the iron extending upward as far as the lugs 115 and cooperating with the point of the housing, as most clearly shown in Fig. 13. At the rear end, the housing 35 comes very close to, but does not contact, the extension 105 of the rear support for the shelf 80. The gap between the two is shown at 118 in Fig. 1.

The housing is made of some easily polished metal. It may be chromium plated or a bright surface, if desired, may be provided thereon in any desired fashion. Upon the outer surface it is highly polished to present a good appearance on the inner surface if not presenting as good appearance, the bright surface affords good reflection for radiation.

A depression 120 is provided in the housing where the shaft 33 extends through it. Holes for the screws cooperating with the shelf 80 at 112 are provided in this depressed portion as well as a hole for the shaft 33.

Where the end of the shaft extends above the bottom of the housing, the metal hub 121 is secured to it by means of a set screw 122, Fig. 1. The hub constitutes an insert in the molded material of adjustment lever 36 which gives the lever the advantages of molded material and also the secure position of a metal portion. A groove in the upper part of the shaft cooperates with the set screw 122 and a knurled head 123 at the top of the shaft provides good connection to the handle 36. The interior of the top of the hub is broached to cooperate with the knurled head. Provision for securing the adjustment lever 36 to the shaft 33 in any desired direction is thus made.

The adjustment lever 36 is provided with a rounded portion to enclose the insert or hub 121 and the rounded portion is provided with a flange 126 upon which indicia 127 are provided which indicate the goods (wool, silk, etc.), upon which the iron can be used to advantage when the heat corresponds to that setting of the thermostat. At one extreme of the indicia, the word "off" is placed and at the other extreme the word "high".

Figure 2:
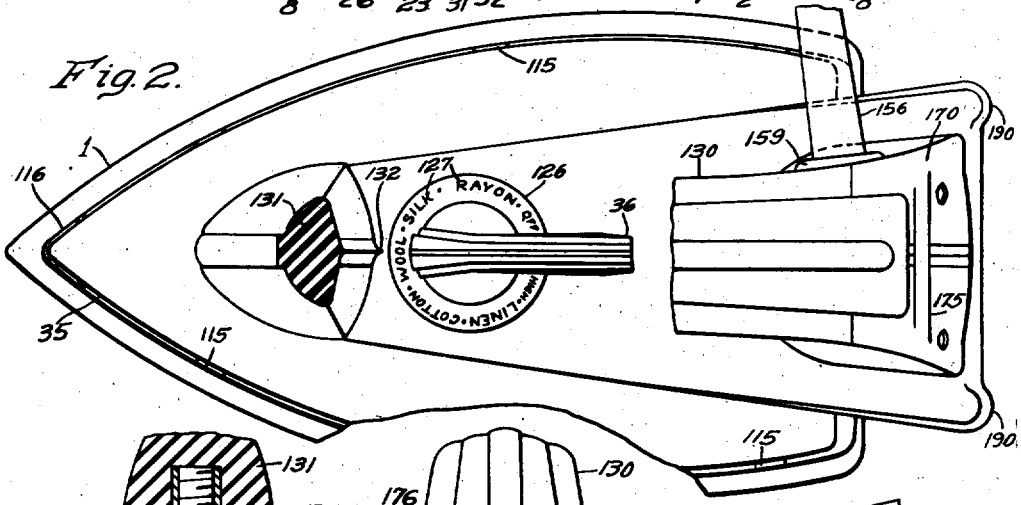
Fig. 2 is a top plan view of the iron with certain parts being broken away.

The sadiron is provided with a handle 130 which is secured to the housing before the housing is put in place. The handle has two uprights; the forward upright, shown in section at 131 in Fig. 2, is provided on the rear surface thereof with a rib which forms a point 132 where it terminates at the surface of the iron. This point is closely adjacent to the flange 126 and so serves as an indicator point for the indicia 127.

The securing of the handle to the housing is illustrated in detail in connection with its forward upright. The foot of each upright is larger than the cross section of the upright itself thus giving a good appearance to the handle. Also the handle thus contacts or comes nearly into contact with the housing over a considerable area. There may be a small gap between the foot and the housing, as shown at 134 in Fig. 1 and in Fig. 4. This gap is too small for the user to easily observe it. A similar gap is provided at 135 under the foot of the rear upright, and it also is not easily observed in the assembled iron.

An insert to afford cooperation between the material of the handle 130 and metal screws is most clearly shown in connection with the front upright of the handle. The insert is of metal and threaded to receive a screw 137. The material into which the inserts extend is preferably molded material, such as some of the condensation products, but any suitable material, even wood, could be used. It should not be metal, however, because it is preferably a thermal non-conductor.

Figure 4:
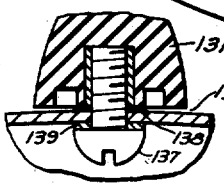
Fig. 4 is a detail sectional view taken on the line IV—IV of Fig. 1.

A washer of asbestos or other thermal insulation is provided at 138, Fig. 4, between the handle and the housing, and a lock washer is conveniently provided at 139 between the housing and the head of the screw. The rear upright preferably has two screws because the rear upright is of greater apparent cross-section, being of sufficient size to contain a recess 141. Similar washers are provided at these screws.

Figure 6:
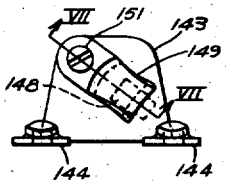
Fig. 6 is a detail view showing in rear elevation the means for securing the end of the cord in place in the recess.

The recess 141 is to house the connections between the flexible cord through which power is supplied and the interior elements of the iron. For this purpose, a metal support plate 143 is provided. It is supported by two ears 144, see Fig. 6, which are integral with the plate 143 and in which threaded holes are provided. The screws which cooperate therewith are the ones mentioned at the end of the last paragraph. They extend through the housing and through an inwardly extending portion of the wall of the recess. One of such screws is shown at 145 in Fig. 1, and the corresponding portion of the molded material is shown at 146. When screws 145 are tightened, the gears 144 of plate 143 are drawn against the molded flanges 146 and secure the handle to the housing without putting much strain upon the floor 147.

Extensions 147' of the portions 146 toward the rear of the iron provide material to hold the lower screws for the cover plate. At the center of the top another lug 152 is provided for the screw at the top of the cover plate.

Figure 7:
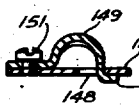
Fig. 7 is a sectional view taken on the line VII—VII of Fig. 6.
Figure 8:
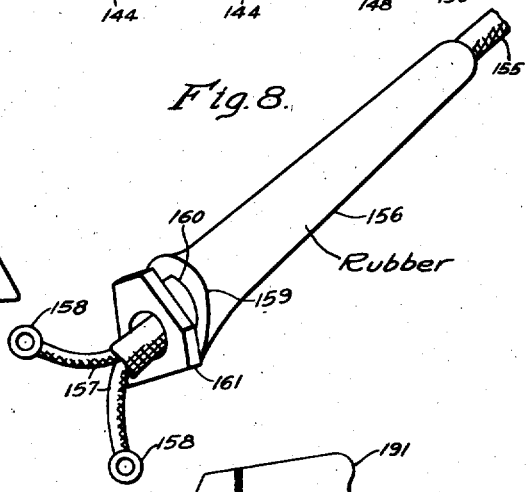
Fig. 8 is a perspective view of the end of the cord and of the insulating reinforcement thereon.

The support plate 143 is provided with a square opening 148, most clearly shown in Fig. 7. An arched fastener 149 is provided with a tongue 150 which enters the opening 148 and serves as a pivot about which the member 149 can move when it is tightened by the screw 151 which passes through a hole in the rear flat part of the fastener 149 and into a threaded hole in the corner of the plate.

The conductor cord 155 extends through a reinforce 156 and through the side wall of the recess 141. The outer insulation of the cord is stripped from its inner end but the insulation on the two conductors is retained. These conductors are separated as shown at 157. The last of the intact part of the cord is passed beneath the arch of the part 149 which holds them against displacement. The roof of the arch 149 is not only rounded to make the arch, but is also transversely concave toward the interior. It is thus of a double curvature, its edges contacting the cord 155 before its center. When the screw 151 is tightened, drawing the member 149 into place, the cord 155 is compressed and the edges of the arch compress it more than does the center. This makes the grip of the arch upon the cord very firm.

One conductor of the cord 155 is secured under one of the screws 160 and the other under the other one. For this purpose, each conductor of the cord is preferably supplied with a ring-shaped terminal 158 permanently secured by soldering or in any other suitable manner to the wire of its conductor.

The reinforce 156 consists of a moldable material such as soft rubber forming a conical covering for the end of the cord. At the end of the reinforce adjacent the side wall of the recess 141 in the handle, the end of the conical part of the reinforce is expanded into a flange 159 which is intended to lie flat against the exterior of the side wall. A reduced portion 160 of the reinforce constitutes the floor of a groove of which the flange 159 is one boundary. The other boundary is a flange 161 which constitutes the end of the reinforce. Preferably, the flange 161 is square with one corner cut off to afford room for the cover of the recess 141.

Figure 19:
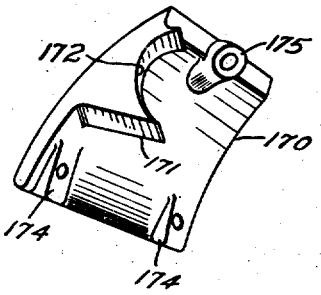
Fig. 19 is a perspective view of the cover for the recess.

The side wall of the recess has a notch 163, Fig. 1, therein to form one-half of the hole through which the cord 155 and the reinforce 156 enter the recess 141. The surface of the edges of this notch are oblique to the faces of the side wall to secure the reinforce and cord in position in the desired direction. The other half of the hole is provided by a notch 172 in a lug on the cover plate 170 shown in Fig. 19.

Figure 3:
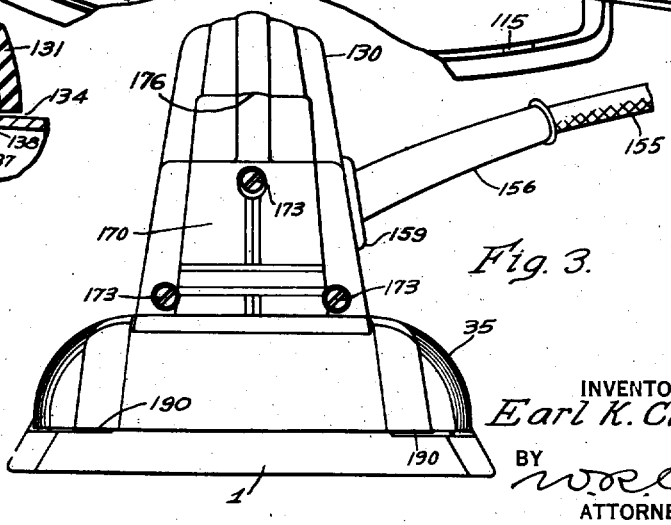
Fig. 3 is a rear elevational view of the iron.

The recess in the rear part of the handle is covered by a plate 170 which has a lug 171 integral therewith forming a portion of the side wall, and ending in a concave surface 172 formed to cooperate with the notch 163 in the side wall and complete the hole for the cord 155 and reinforce 156. The edge surface 172 is oblique to the side faces of lug 171 to provide for the direction of the cord. This cover plate is secured in place by screws 173 at three points, best shown in Fig. 3. Lugs 174 and 175 on the cover 170 provide normal surfaces to meet corresponding surfaces on lugs 147 and 152 within the recess. The screws 173 are received in threaded portions of the molded material of the handle and draw the cover 170 into position at the same time compressing the rubber of the reinforce at the bottom 160 of the groove and fitting the flanges 159 and 161 snugly against the side wall.

In assembling the cord and iron, the reinforce 156 is placed on the cord leaving enough of the end of the cord exposed to provide the connections to the binding screws 100. The end of the reinforce is then put into the iron, one side of the floor 160 of the groove fitting the notch 163, while the other side will fit the notch 172 in the lug at the side of the cover when the cover is put on. The portion of the end of the cord just inside the reinforce is then secured under the arch of fastener 149. The ends are separated and each equipped with a ring terminal 158 which is then secured under the heads of screws 100.

The cord 155 is flexible and the reinforce 156 is progressively more flexible toward the thinner end of the conical part. The thick end of the conical part is fairly stiff and when reinforced by the flanges 159 and 161 is sufficiently stiff to give to the portion of the cord just exterior to the side wall a definite direction.

This direction makes an angle of substantially sixty degrees with the surface of the side wall, but this surface is not parallel either with the front-to-back direction of the sadiron or with the base-to-top direction. Because this surface is oblique, the direction of the cord at its starting point is oblique.

The handle includes two uprights. The forward one is oblique, slanting toward the rear as it rises and ending in a rounded corner which merges with the hand portion of that handle. The rear upright has been made of greater cross-sectional dimensions, being apparently much thicker. This is in order to accommodate the recess 141, and the walls of this recess have been made to conform to the general curved shape of the handle so that nothing in the appearance of the handle suggests that the rear portion has been made larger for a merely mechanical purpose.

The portion of the handle between the uprights has its smallest cross-section near the rear upright. Its greatest cross-section is forward of the center but not at the junction with the forward upright. The shape thus produced fits the operator's hand comfortably.

The cover 170 is curved and fits the recess 141 in such a way as to make the face of the surface of the rear upright conform to the general curve of that part of the handle.

Just above the cover 170, a projection 176 is provided by means of which the iron can be stood upright, resting upon the projection 175 and the rear corners 190 of the housing. If the operator has occasion to make the iron cool as rapidly as possible, this position is convenient for that purpose and in this position the cord 155 and its reinforce 156 do not contact with the surface upon which the iron is resting.

In the operation of the device, when the iron is not in use, the current is switched off. This is done by rotating the adjustment lever 36 counter-clockwise until it is stopped. The stopping is effected by the projecting piece 67 coming into contact with the post 69. As it comes into this position, it pushes the arm 66 toward the rear of the iron which moves the lever 56 into the position shown in Fig. 16, in which the contact 54 is separated from the contact 50.

To the operator it would appear that the adjustment lever 36 was stopped by the interference of the forward upright of the handle 130 in its rotation, because, when the adjustment lever 36 has reached the position in which the current is shut off, which is the position in which the point 132 is opposite the index mark "off", the adjustment lever 36 will have nearly contracted with the upright in question. This is the position in which the adjustment lever 36 is left when the iron is not in use. Normally it is not disturbed after the current is shut off.

When the iron is to be put to use, the end of the cord 155 is connected to a source of power in the usual way; by a wall socket, for example. Current then flows through one conductor of the cord to one of the terminal connectors 100, say, for example, to that associated with the upper upright 99 in Fig. 9. Current flows along this upright to the conductor 88 and thence to the screw 92 and so to the ribbon 77. It descends this ribbon to the contact member 54 and is there interrupted, unless the adjustment lever 36 has been moved from the last-described position.

When the adjustment lever 36 is moved, it is necessarily in a clockwise rotation (Fig. 2), since it was at its extreme counter-clockwise position. Movement of the adjustment lever 36 in clockwise direction causes the cross piece 67 to depart from the post 69 and release the upright 66. This causes the spring 68 to move the apex of the triangular part 59 of the lever upward. The screws 62 cause the movement of the lever to be about the heads of the screws 62 as a pivot. The contact 54, therefore, descends and meets the rivet head 50. Thence current passes through the rivet 50 to contact 45 and abutting contact 43, thence through conducting strips 38 and 37 to the other contact 43 which cooperates with the lower end of rivet 49. This brings the current to the ribbon 70 which is connected at the screw 91 with the conductor 89. Current passes along conductor 89 to the other end of it where the conductor is fastened by a screw 180 to a ribbon 181, leading to a terminal of the heater. The current passes through the heater to the other terminal thereof where it is received by a ribbon 182 and follows up this ribbon to the conductor 90. The upright part 99 of this conductor leads to the other terminal 100 from which it passes into the other conductor of the cord 155 and so back to the power supply.

The heater 2, energized by this current, heats the iron. Most of the heat passes directly by conduction from the heater into the base 1, but some of it passes from the heater into the copper sheet 8. It flows along this sheet in all directions to the edges thereof where the copper flanges 9 are in intimate contact with the upstanding edges of the base 1. The welds 16 and 17 conduct heat to the edges 3 and 18 better even than the contact mentioned. The heat readily flows from the copper through the edges 3 into the base. Some heat passes through the copper sheet into the steel cover plate 11, but since steel is a poorer conductor of heat than copper, only a minor fraction of the heat will pass through the plate 11 into the space covered by the housing 35.

From the plate 11 some heat passes up the leg 81 to the shelf 80. There is good thermal conductive contact between the foot of the leg 81 and the base 1. This is afforded by the screw 82 which is as tight as it can readily be made in order that it may assist the screw 15 in preventing buckling. The tight clasp of the screw 82 upon the foot of the oblique part 81 prevents relative movement between it and the base. The hole instead of being round is elongated in order to provide for variations in mechanical assembly.

Figure 11:
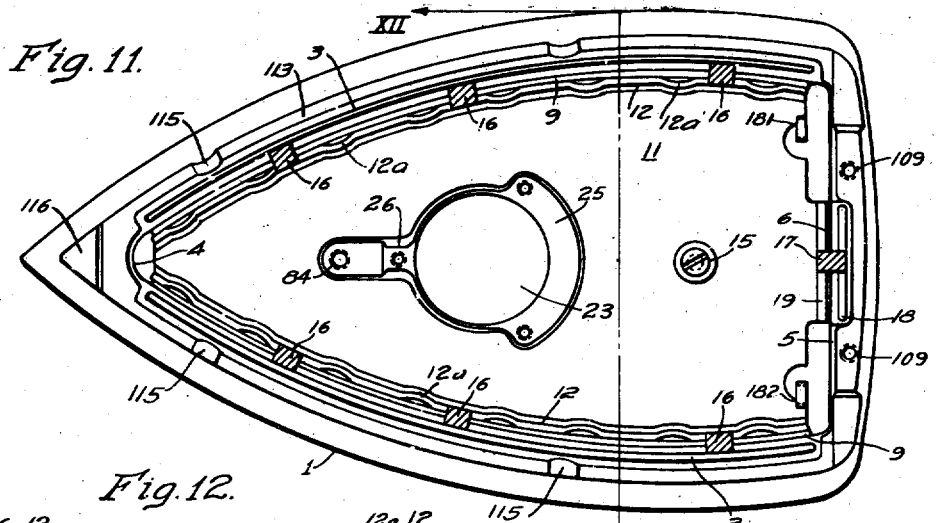
Fig. 11 is a top plan view of the base of the iron and the parts permanently secured thereto.

The opposite end of the shelf 80 is secured by screws through the holes in the tabs 107, see Fig. 9, into the holes 109, see Fig. 11. Very little heat can flow into the shelf 80 along the parts 81 or 108 even though these parts have good thermal contact with the base. The shelf, therefore, is not much heated by conduction.

The plate 11 is finished in dull nickel. It has been found of small, if any, advantage to make it bright. The heat which flows up through the plate 11 is radiated into the space above it to so small an extent that little, if any, advantage will be obtained by making it bright.

The base 1 does not come directly into contact with the housing 35. It touches the housing at the lugs 115. These are the only direct thermally conductive connections from the base to the housing. An indirect and poor conductive connection is from the base through the screw 82, the leg 81, the shelf 80 and the screws which enter the holes 112 in the shelf, but only a little heat will be conducted in this way from the base to the bottom of the depression 120 which is part of the housing.

The housing 35 rests on the lugs 115 which extend upward from the ledge 113 but the housing does not necessarily touch the flange 3. It is secured from lateral movement by the screws which fasten it to the shelf 80 at the holes 112 and the shelf is in turn secured against such movement by screw 82 and those in holes 109. Further security is afforded by the flange 3 but the housing 35 does not contact the flange firmly and thus little thermal conduction occurs through the flange into the housing.

The outer surface of the housing 35 is bright and the housing, therefore, is a poor radiator, so that it abstracts very little heat from the iron and delivers little to the operator's hand. The interior of the housing is not polished. It receives so little heat from the plate 11 by radiation that little, if any, advantage would result from having it bright.

The handle 130 is preferably of a material which is thermally a poor conductor.

Very little heat, therefore, reaches the operator's hand either by radiation from the top of the housing or by conduction through the handle. The conduction through the handle is further diminished by the thermal insulation 138 separating the handle from the top of the housing at each of the screws 137 and 145, and by the space between the end of the handle and the housing. The operator, therefore, experiences little, or no, inconvenience from the heat of the iron.

Moreover, the copper plate 2 affords a good thermal shunt which, by diverting a large portion of the upwardly directed heat from its upward travel into the base, makes the portion of the heat which is transmitted upward in the several ways described much smaller than it would otherwise be.

As the base of the iron is heated, the thermostat being located in the well 23 and, therefore, well connected thermally to the base, is also heated. The foundation plate 29, because it covers the well 23, shuts in the heat within the well, so that the disk 31 quickly takes the temperature of the base. The bimetallic structure of the disc 31 causes it, when heated, to tend to become concave upon its lower face.

An elastic stress in the disk 31 is produced by the pull of the shaft 33 against the center of the disk and the resistance of contacts like 45 to the upward movement of the disk-carried contacts such as 43. The greater this elastic stress, the less the change in configuration which must be produced by the bimetallic action in response to the heat. Thus, the higher the shaft 33, that is, the higher the central part of the disk before it is heated, the smaller the temperature change through which it must be heated to cause it to pass that configuration at which it snaps, becoming concave downward. When the snap occurs, the contacts 43 open and current to the heater is shut off at two points adjacent the separated ends of conductors 37 and 38.

When the adjusting lever 36 is rotated clockwise, it rotates the shaft 33 which, cooperating with the nut 71, descends and thus decreases the elastic strain in the disk. To decrease the elastic strain is to increase the strain which must be introduced by the bimetallic differential expansion, that is to increase the temperature to which the iron must be heated before the disk snaps.

The graduations 127 upon the flange 126 are such that, as the adjusting lever is rotated clockwise, first the mark "off" departs from the point 132 and the mark "rayon" comes into register with that point. Upon further rotation in the same direction, the mark "silk" comes into register with the point 132 and so on. Rayon is goods with respect to which only a low temperature of the iron is required. Silk calls for somewhat higher temperature; and so on, the highest temperature being required by linen.

The marks on the dial 126 thus indicate progressively higher temperatures as the dial is rotated clockwise and the mark "high," representing the limit of motion in the clockwise direction, corresponds to goods requiring a higher temperature than anything mentioned upon the dial. When the dial is rotated in the opposite direction successively, lower temperatures are called for to produce the snap action of the thermostat, until the mark "rayon" is in register with the point 132.

A further counter-clockwise movement of the adjusting lever 36 operates the switch lever 64 in the way already described and causes it to assume the position shown in Fig. 16 with the contact 54 open.

If during the operation of the iron it is desired to remove it from the goods, whether the current be shut off or not, the iron may be placed in the position shown in Fig. 13, in which the projection 176 and the rear end of the housing 35 rest upon the table or other support.

In order that there may be small thermal conduction between the iron and the support and also to reinforce the housing, so that, even if the iron is thumped when put into the position shown in Fig. 13, the housing will not be dented, the corners of the housing are rounded, as indicated, in Fig. 2 at 190. The rearward extension of the support 195 has rounded corners 191 which conform to the rounded parts 190. They do not touch them but leave a small gap similar to the gap 118 shown in Fig. 1. Thus, the iron will not suffer, even from rough handling, when placed in this position. From the position of Fig. 13, the iron may quickly be lifted for use, because the handle 130 is readily available.

The direction of the reinforce 156, and so of the portion of the cord 155 near the iron, is such that, as shown in Fig. 13, the cord will not contact the supporting surface except at a distance from the iron greater than several inches. Wear upon the cord because of this idle position of the iron is thus avoided.

In the working position of the iron, when used by an ordinary right-handed operator, the position of the cord is away from the operator. It will not, therefore, interfere with the manipulation of the iron. Moreover, because it is oblique to the horizontal position, the cord 155 is unlikely to drag upon the table or ironing board and unless the worker is using a floor outlet, it is not likely even to rub against the edge of the table. Interference with the work by the cord is hereby avoided.

It will occur to those skilled in the art that many changes in detail come within the spirit of this invention. The specific description of the details illustrated is not to be regarded as a limitation. The only limitations intended are those expressly stated in the claims or required by the prior art.

What I claim is:

1. In a sadiron, a base plate, a housing covering said plate and a handle mounted on said housing, said handle having a recess in the rear end, a flexible connector extending into said recess through a side wall thereof in a direction oblique to the base, making an angle with the longitudinal direction of the handle less than an obtuse angle.

2. In a sadiron, a base plate, a housing covering said plate and a handle mounted on said housing, said handle having a recess in the rear part, a flexible connector extending into said recess through a side wall thereof in a direction oblique to the base, making an angle with the longitudinal forward direction of the handle less than an obtuse angle, a flexible reinforcement covering said conductor, said reinforcement extending through the side wall, increasing progressively in mechanical strength from its outer end to the side wall, said reinforcement and side wall having a flange-and-groove connection between them to give firm anchorage for said conductor.

3. In a sadiron, a handle comprising two portions upstanding from the iron and a longitudinal portion between them, a recess in the rear upstanding portion and a closure for said recess conforming to the lines of the handle.

4. In a sadiron, a handle comprising two portions upstanding from the iron and a longitudinal portion between them, a recess in the rear upstanding portion and a closure for said recess conforming to the lines of the handle, a cord for delivering power to the iron and connectors housed in said recess with which the cord conductors are united.

5. In a sadiron, a body housing, a handle thereon comprising two uprights and a hand portion, a receptacle in the rear upright, a supply cord leading to said receptacle, a cover for said receptacle, an orifice partly in the wall of said receptacle and partly in said cover, a reenforcement for said cord extending through said orifice and fastening means securing the cover to the upright to close said receptacle, said fastening means drawing the cover and handle together and so compressing the reenforcement.

6. In a sadiron, a heater, a base heated thereby, a housing on said base, a handle on said housing comprising uprights and a connecting portion, each of said uprights having a foot comprising an edge portion, a central portion and a recess separating said portions, a heat insulating material separating said central portion from said housing and thereby spacing the edge portion from the housing and a fastening means extending through said material and securing said handle to said housing.

7. In a sadiron, the combination of a base plate having a bottom ironing surface, a cover mounted upon the base plate, said base plate and cover having a front end and a rear end, a handle mounted upon the cover and extending in a direction from front to rear, said handle embodying an upper, generally horizontally-extending gripping portion and depending leg portions at the front and rear ends thereof, said gripping portion and said rear leg portion being so joined that the rear or outer surface of the rear leg portion and the upper surface of the gripping portion lie in a substantially continuous smooth curve, an outwardly-extending projection provided on the handle near the juncture of the horizontally-extending gripping portion and the rear leg portion for providing a support for positioning the iron in an inactive upright position, said rear leg portion embodying front, side, and rear walls forming an interior chamber near the bottom thereof for electrical terminals located within said chamber, a pair of flexible electrical conductors extending through a common side wall of the rear leg portion of said handle into said chamber for connection to the terminals, and a retaining member encompassing the flexible conductors and supported in and projecting a substantial distance from the rear leg portion of the handle for retaining both of said flexible conductors in a substantially fixed position with respect to the base plate and cover, whereby both flexible electrical conductors approach and enter the handle from one of the said side walls of the rear leg portion thereof.

8. In a sadiron, the combination of a base plate having a bottom ironing surface, a cover mounted upon the base plate, said base plate and cover having a front end and a rear end, a handle mounted upon the cover and extending in a direction from front to rear, said handle embodying an upper, generally horizontally-extending gripping portion and upstanding leg portions at the front and rear ends thereof and said gripping portion and rear leg portion being formed of non-metallic heat-resisting material, said rear leg portion embodying spaced front and rear and spaced side walls defining an internal chamber for electrical terminals, said rear wall of the rear leg portion and the upper surface of the gripping portion lying in a simple curve, said handle including an outwardly-extending projection adjacent the juncture of the gripping and rear leg portions for providing a rest for the iron when in an upright inactive position, a pair of flexible electrical conductors extending through a common side of said handle and into said chamber for connection to said terminals, a sheath encompassing a substantial length of both of said flexible conductors outside of the chamber and extending into the handle in spaced relation from the cover, and means for retaining said sheath in the handle, said sheath being composed of non-metallic molded and flexible material, the degree of flexibility of said sheath being less than that of said flexible conductors, whereby the flexible electrical conductors are retained in spaced relation from one side of the iron and whereby said molded material is thoroughly insulated from the cover by a portion of the handle.

9. In an electric iron, the combination of a metallic base structure having an ironing surface, a handle for the iron formed of heat-insulating material and including front and rear legs that are fixed to the casing structure and a grip portion connecting the upper ends of the legs, said rear leg being integral with the grip portion and having a chamber formed in the bottom portion thereof for electrical terminals, said handle having an opening formed in a side thereof and communicating with the chamber, said opening being spaced upwardly from said base structure whereby a substantial part of the rear leg of the handle defines a heat break between said opening and the base structure, a flexible service cord for connection to said terminals extending from said chamber and a reinforcing member enclosing said service cord and fixed within said opening, said member extending generally in a horizontal direction transversely of the grip portion of the handle.

10. In an electric iron, the combination of a metallic base structure having an ironing surface, a handle for the base structure including spaced leg portions extending upwardly from the base structure and a grip portion connecting said leg portions, said leg portions and said grip portion being formed of non-metallic heat-insulating material, one of said leg portions having a chamber formed therein adjacent the bottom thereof for housing electrical connections for the iron, an electric service cord extending into said chamber for permanent attachment to the electrical connections, a detachable cover embodied in said leg portion and conforming with the contour thereof for affording ready access to said chamber, and a reinforcing member carried by the handle for enclosing both wires of the service cord, said member extending laterally from the handle in a direction generally transverse of the grip portion of the handle and said member being spaced from the bottom of said leg portion so that a heat break is defined between the base structure and the reinforcing member.

11. In an electric iron of the permanently attached cord type, the combination of a base structure, a handle carried by the base structure and including spaced front and rear leg portions and a grip portion connected thereto, said grip portion and said rear leg portion being formed of heat insulating, non-metallic material and said rear leg portion having front, rear, and side walls, the oppositely-disposed walls of said rear leg portion diverging downwardly and defining a chamber for electrical terminals within the rear leg portion, one of said side walls of said rear leg portion having an opening therein spaced above said base structure, whereby a substantial portion of the rear leg portion defines a heat break between the base structure and the opening, a pair of flexible conductors for connection to said terminals, extending outwardly through said opening and a reinforcing support, less flexible than the conductors, carried by said side wall of the rear leg portion and extending generally in a horizontal direction transversely of the grip portion of the handle for encompassing and supporting the flexible conductors so that the portion of the conductors adjacent the iron is maintained in vertical spaced relation with respect to the base structure and the material being pressed.

EARL K. CLARK.